US011316951B2

(12) United States Patent
Cooney et al.

(10) Patent No.: US 11,316,951 B2
(45) Date of Patent: Apr. 26, 2022

(54) POLYTREE QUEUE FOR SYNCHRONIZING DATA WITH A SHARED RESOURCE

(71) Applicant: Citrix Systems, Inc., Fort Lauderdale, FL (US)

(72) Inventors: Michael Cooney, Cary, NC (US); Gaurav Saraf, Apex, NC (US); Shashank Choudhary, Raleigh, NC (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 100 days.

(21) Appl. No.: 16/587,125

(22) Filed: Sep. 30, 2019

(65) Prior Publication Data

US 2021/0099543 A1  Apr. 1, 2021

(51) Int. Cl.
*H04L 67/60* (2022.01)
*H04L 67/10* (2022.01)
(52) U.S. Cl.
CPC .............. *H04L 67/32* (2013.01); *H04L 67/10* (2013.01)
(58) Field of Classification Search
CPC ................................ H04L 67/10; H04L 67/32
See application file for complete search history.

(56) References Cited

U.S. PATENT DOCUMENTS

| 7,283,472 B2 * | 10/2007 | Widmer | H04L 47/2441 370/230.1 |
| 2010/0324948 A1 * | 12/2010 | Kumar | G06Q 10/06311 705/7.13 |
| 2013/0346274 A1 * | 12/2013 | Ferdinand | G06Q 40/04 705/37 |
| 2014/0282585 A1 | 9/2014 | Dictos et al. | |
| 2015/0193489 A1 * | 7/2015 | Bachar | G06F 16/2282 707/756 |
| 2016/0070820 A1 * | 3/2016 | Laine | G06T 1/60 707/797 |
| 2016/0103828 A1 * | 4/2016 | Woolf | G06F 16/164 707/705 |
| 2018/0276040 A1 | 9/2018 | Hosmani et al. | |

OTHER PUBLICATIONS

Cho et al. Resilient Multipath Routing With Independent Directed Acyclic Graphs 2010 IEEE Intl Conference on Communications (Year: 2010).*
International Search Report and Written Opinion for Application No. PCT/US2020/048757 filed Aug. 31, 2020; pp. 15.

* cited by examiner

*Primary Examiner* — Jason D Recek
(74) *Attorney, Agent, or Firm* — Hoffman Warnick LLC

(57) ABSTRACT

A system, method and program product for synchronizing client-based data with data in a shared resource. A system is provided that receives data from a plurality of client devices, the data being indicative of at least one action associated with a shared resource accessible by the plurality of client devices, and inserts a plurality of actions indicated by the data as nodes into a polytree queue, wherein actions that do not depend on other actions in the polytree queue are inserted as root level nodes, and actions that depend on other actions in the polytree queue are inserted as child nodes. The system further executes the nodes in the polytree queue to synchronize the data from the plurality of client devices with the shared resource, wherein root level nodes are scheduled for immediate concurrent execution, and execution of child nodes is delayed until parent nodes of an associated child node are executed.

17 Claims, 6 Drawing Sheets

POLYTREE QUEUE FOR SYNCHRONIZING DATA WITH A SHARED RESOURCE

BACKGROUND OF THE DISCLOSURE

On-demand content collaboration tools provide the ability for users to manipulate a shared resource on-demand and also keep content and metadata synchronized (i.e., "synced") with a server computer. This means that whenever a user performs an action on a personal computer, the action needs to be pushed to and synchronized with the server computer. For example, in a cloud environment, file system actions on an MS Windows® client such as create, delete, move, rename, update, etc., need to be synced with the cloud platform in a time sensitive manner.

BRIEF DESCRIPTION OF THE DISCLOSURE

Aspects of this disclosure provide a system, method and program product for synchronizing actions taken with respect to shared resources in a collaborative environment. In one example, file system related actions taken on one or more client devices are synchronized with a cloud computing system using a polytree queue.

A first aspect of the disclosure provides a system having a memory and a processor coupled to the memory. The processor is configured to receive data from a plurality of client devices, in which the data is indicative of at least one action associated with a shared resource accessible by the plurality of client devices. The processor is further configured to insert a plurality of actions as nodes into a polytree queue, wherein actions that do not depend on other actions in the polytree queue are inserted as root level nodes, and actions that depend on other actions in the polytree queue are inserted as child nodes. In addition, the processor is configured to execute the nodes in the polytree queue to synchronize the data from the plurality of client devices with the shared resource, wherein root level nodes are scheduled for immediate concurrent execution, and execution of child nodes is delayed until parent nodes of an associated child node are executed.

A second aspect of the disclosure provides a method that includes receiving data from a client device, the data being indicative of actions associated with a shared resource accessible by a plurality of client devices. The method further includes inserting the actions as nodes into a polytree queue, wherein actions that do not depend on other actions in the polytree queue are inserted as root level nodes, and actions that depend on other actions in the polytree queue are inserted as child nodes. The method also includes executing nodes in the polytree queue to synchronize data from the client device with the shared resource, wherein root level nodes are scheduled for immediate concurrent execution, and execution of child nodes is delayed until parent nodes of an associated child node are executed.

A third aspect of the disclosure provides a computer program product stored on a computer readable medium, which when executed by a processor, synchronizes client device data. The program product includes program code for receiving data from a client device, the data being indicative of actions associated with a shared resource accessible by a plurality of client devices. Also included is program code for inserting the actions as nodes into a polytree queue, wherein actions that do not depend on other actions in the polytree queue are inserted as root level nodes, and actions that depend on other actions in the polytree queue are inserted as child nodes. Further included is program code for executing nodes in the polytree queue to synchronize the client device with the shared resource, wherein root level nodes are scheduled for immediate concurrent execution, and execution of child nodes is delayed until parent nodes of an associated child node are executed.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for synchronizing a shared resource in a collaborative computing environment. In one embodiment, a polytree queue is utilized to synchronize file system related actions taken at one or more client devices with a centralized data processing infrastructure, such as a cloud computing system. The technical solutions improve the operation of the collaborative computing environment by improving the speed and efficiency at which a shared resource can be synchronized. As described herein, actions occurring at a client device are inserted into a polytree queue prior to execution on the centralized data processing infrastructure to enhance the ordering of execution. Actions that are not dependent on other actions in the polytree queue can be executed immediately in a concurrent fashion, thus enhancing the synchronization process.

One approach to ensuring accurate synchronization would be to execute all actions synchronously on both the local client device and the cloud platform. Limitations with this approach however include: (1) the fact that a user could experience significant time lags waiting for the action to execute on the cloud platform before further actions can be taken on the client device; and (2) the client device may not be connected to the Internet. Another approach would be to queue actions in the cloud platform for sequential execution. However, such an approach requires that actions be executed in the order they are received, limiting the opportunities for concurrent or optimized processing. By utilizing the polytree queue as described herein, such limitations are overcome.

Figure 1:
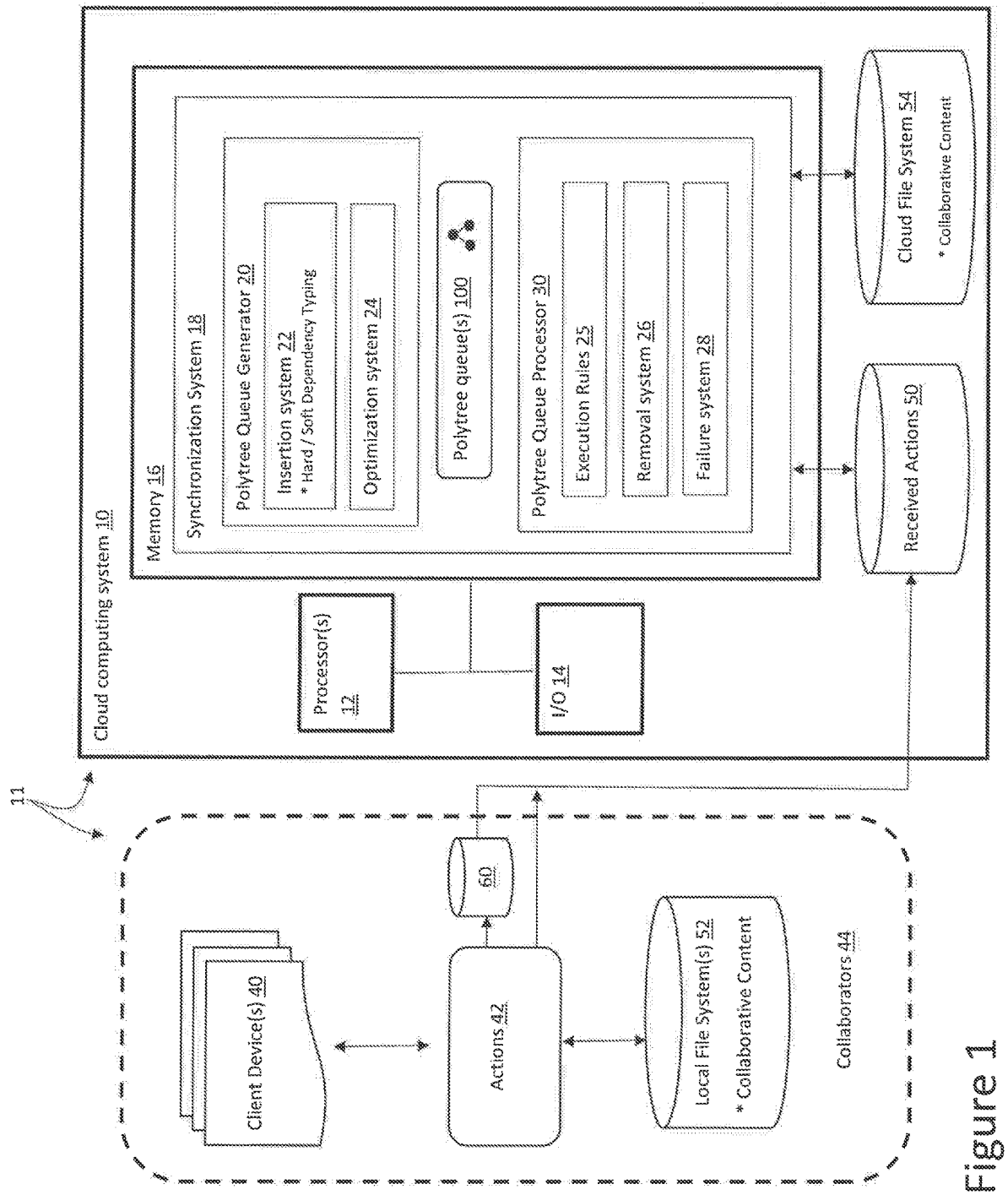
FIG. 1 depicts a content collaboration system having a synchronization system in accordance with an illustrative embodiment.

Referring to FIG. 1, a content collaboration system 11 is shown that generally includes a cloud computing system 10 and a set of collaborators 44. Collaborators 44 generally refer to users or systems that interact with a shared resource, such as collaborative content that resides both on a client device 40 and on the cloud computing system 10. Accordingly, collaborators 44 can collaborate on (i.e., view, manipulate, save, etc.) copies of the same shared resource. Cloud computing system 10 may for example comprise a server environment that includes a cloud file system 54 for holding collaborative content generated by the collaborators 44. Collaborators 44 generally include one or more client devices 40 (e.g., personal computers, smart devices, Internet of Things (IoT) devices, virtual desktops, etc.) that perform actions 42 associated with collaborative content on one or more local file systems 52. Collaborative content may include any type of data, including but not limited to, text files, image data, presentation data, spreadsheet data, audio visual data, file systems, computer programs, logic, artwork, etc. Illustrative actions 42 may for example include file system related actions such as: delete, move, copy, save, create, update, upload, etc.

As noted, when an action 42 occurs on a local file system 52, the action 42 must also occur (i.e., be synchronized) with the cloud file system 54. For example, if a file is moved from a first folder to a second folder on the local file system 52 by a client device 40, the action 42 likewise occurs on the cloud file system 54 so that the data on both files systems remain in sync with one another. To achieve this, cloud computing system 10 processes received actions 50 inputted from collaborators 44 with a synchronization system 18 that processes the received actions 50 utilizing a polytree structure, referred to as a polytree queue 100. The polytree queue 100 provides a mechanism for temporarily storing and prioritizing actions for execution by the cloud computing system 10.

Actions 42 may be loaded to cloud computing system 10 from the collaborators 44 as data in any format or manner. In some cases, actions 42 can be loaded, e.g., via a network such as the Internet, in a synchronous manner as they occur by the client devices 40. In other cases where for example the client device 40 is off-line, actions 42 may be loaded asynchronously, e.g., in a batch mode after being temporarily stored in a local queue 60 until a network connection is established.

Synchronization system 18 generally includes a polytree queue generator 20 that inserts and manages actions as nodes within a polytree queue 100, and a polytree queue processor 30 that executes nodes representing actions in the polytree queue 100 according to a defined scheme. Polytree queue generator 20 generally includes: an insertion system 22 that inserts received actions 50 as nodes into the polytree queue 100; and an optimization system 24 that optimizes nodes in the polytree queue 100, e.g., by combining or eliminating actions.

Note that synchronization system 18 may utilize one or more polytree queues 100 depending on the desired implementation. For example, in one embodiment, a single polytree queue 100 may be utilized for processing actions 42 from multiple client devices 40. In a further embodiment, a unique polytree queue 100 may be generated for each client device 40 or user such that only actions generated by a specific client device 40 or user are processed by the given polytree queue 100. In still a further embodiment, different polytree queues 100 may be deployed for different shared resources, e.g., different polytree queues 100 may be allocated for different root directories within a file system. In yet another embodiment, different polytree queues 100 may be allocated for different user groups.

Polytree queues 100 comprise tree structures having nodes generated based on received actions 50 and connectors that represent dependencies between the actions. For example, assume a simple case in which two received actions 50 are processed for insertion by insertion system 20 into a polytree queue 100, including "create a directory Folder /A" and "create a new file xyz in Folder /A." In this case, the polytree queue 100 would include a root node that contains the first action "create a directory Folder /A" and a child node that contains the second action "create a new file xyz in Folder /A." As is evident, the second node occurs after the first node, and is therefore dependent on the first node.

In one embodiment, insertion system 22 processes received actions 50 in a sequential basis for insertion into polytree queue 100. Generally, actions that do not depend on other nodes in the polytree queue 100 are inserted as root level nodes, and actions that depend on other nodes in the polytree queue 100 are inserted as child nodes. Root level nodes refer to nodes in the polytree queue 100 that have no parent nodes, i.e., root level nodes do not depend on other nodes executing first. In operation, each action is evaluated against a list of root level nodes by the insertion system 22 to check whether or not the action is dependent on completion of any nodes. If no, the action is inserted as a root node. If yes, insertion system 22 recursively performs the same evaluation against dependents (i.e., children, grandchildren, etc.) of the root node. If the inserted action is identified as dependent on a parent node, but not dependent on any of the parent node's children, the action is inserted as a child node of that parent node.

Polytrees are distinguishable from other tree types in that nodes can have multiple parents, which are needed for situations in which an action is dependent on multiple unrelated actions. For example, consider the actions create Folder /A, create Folder /B, create a file xyz in Folder /A, and move the file xyz from Folder /A to Folder /B. The actions of creating Folder /A and Folder /B are both implemented as root nodes (they do not depend on each other). However, the action of moving the file from Folder /A to Folder /B is a child of both the root nodes, i.e., both folders must be created first before the move can occur. Accordingly, when inserting a new node representing an action, the new node may be dependent on multiple parent nodes, so all branches of the polytree queue 100 must be examined for insertion. Thus, even after a dependency is located (e.g., "move file xyz" is a dependency in the create "Folder /A" branch), all other branches must be checked for dependencies (e.g., "move file xyz" is also a dependency in the create "Folder /B" branch). Further, when checking for dependencies within each branch, all root nodes, child nodes, grandchild nodes, etc., are checked.

A further enhancement to polytree queue 100 involves the use of a mechanism, such as a linked list, to help maintain a priority for executing actions at the root node level. For instance, in the above example, the action of creating Folder /A is received before the action of creating Folder /B. Accordingly, within the polytree queue 100, a linked list is generated specifying that Folder /A should be executed first, e.g., (Create Folder /A)→(Create Folder /B). As is understood in the art, a linked list generally comprises a linear collection of data elements, whose order is not given by their physical placement in memory. Instead, each element points to the next, which provides a prioritization among nodes at the root level.

In association with the insertion process, optimization system 24 may be deployed to collapse portions of the polytree queue 100 during node insertion. In particular, whenever a child node is added (which is dependent on an existing parent node) in the polytree queue 100, optimization system 24 checks if the parent can "consume" the child, or vice versa. Namely, various rules can be implemented to determine whether one of the nodes can be eliminated or whether a single new node can replace both the parent and child nodes. For example, consider the following case involving a pair of "Rename" nodes in which a new single node can replace the parent and child. First, a node is inserted in which Folder /A is renamed to Folder /B. Next, a node is inserted that renames Folder /B to Folder /C. Instead of including both nodes one after each other, optimization system 24 can collapse the two through an optimization process to create a single node that renames Folder /A directly to Folder /C.

In a further example, consider the case involving an Upload action and a Rename action for a file. First, a new file "a.txt" gets uploaded into a folder, and then the new file gets renamed to "b.txt." In this case, the Upload node can consume the Rename node and a new single node can be created that will upload the file into the folder directly as b.txt.

In still a further example, consider the case involving an Upload action followed by a Delete action. In this case, a first node uploads a file a.txt into Folder /A, and the second node deletes Folder /A. In this case, the Delete node will essentially consume and cancel the Upload node resulting in a Delete node. Accordingly, only a single node (i.e., the Delete action) remains.

Once a polytree queue 100 is generated, nodes that represent actions within the polytree queue 100 are executed by polytree queue processor 30 according to a set of execution rules 25. Execution of the nodes can occur concurrently at the same time nodes are being inserted into the polytree queue 100 (e.g., as a parallel process) or at some point after it is generated (e.g., as a sequential process).

In one illustrative embodiment, execution rules 25 dictate that root level nodes are scheduled for immediate execution, and execution of any child nodes associated with a parent node(s) is delayed until the parent node(s) is executed. Once a root node is executed, the root node is removed from the polytree queue 100 by a removal system 26, and any child nodes of the root node are promoted to the root level for execution, unless the child node has other parent nodes, in which case promotion of the child node is delayed until all parent nodes are executed.

As noted, root level nodes are tracked in a linked list or the like such that previously added root level nodes are prioritized over later added root level nodes (i.e., a first-in first-out scheme). While the link list provides a general order of execution of root level nodes, execution of root level nodes can occur concurrently, allowing actions to be synced to the cloud in an expeditious manner. Thus, when a root node at the head of the linked list begins to execute, the polytree queue processor 30 need not wait until execution is complete before executing subsequent root level nodes. Instead, execution of root level nodes can occur simultaneously, while dependent nodes are delayed until all actions of its respective parent nodes are executed.

If an action fails during execution, the node and all the nodes that are dependent on the failed action can be removed for later retry or roll back by failure system 28. The failure system 28 may attempt to re-insert an entire subtree (i.e., the branch containing the failed node and any dependent nodes) for retry and/or perform an appropriate failure protocol (e.g., notify a user, etc.).

In one embodiment of failure system 28, the decision whether to remove all dependent nodes or to just cancel the node representing the failed action depends on the type of dependency assigned to the nodes. In this case, dependencies between nodes may be typed as a soft dependency or a hard dependency. A soft dependency means that the actions associated with two dependent nodes cannot execute at the same time, but there is no strict ordering between the actions. Thus, the child node can still execute if the parent node fails. A hard dependency means that strict ordering matters and an action represented by a child node cannot execute if the parent node fails.

Figure 2:
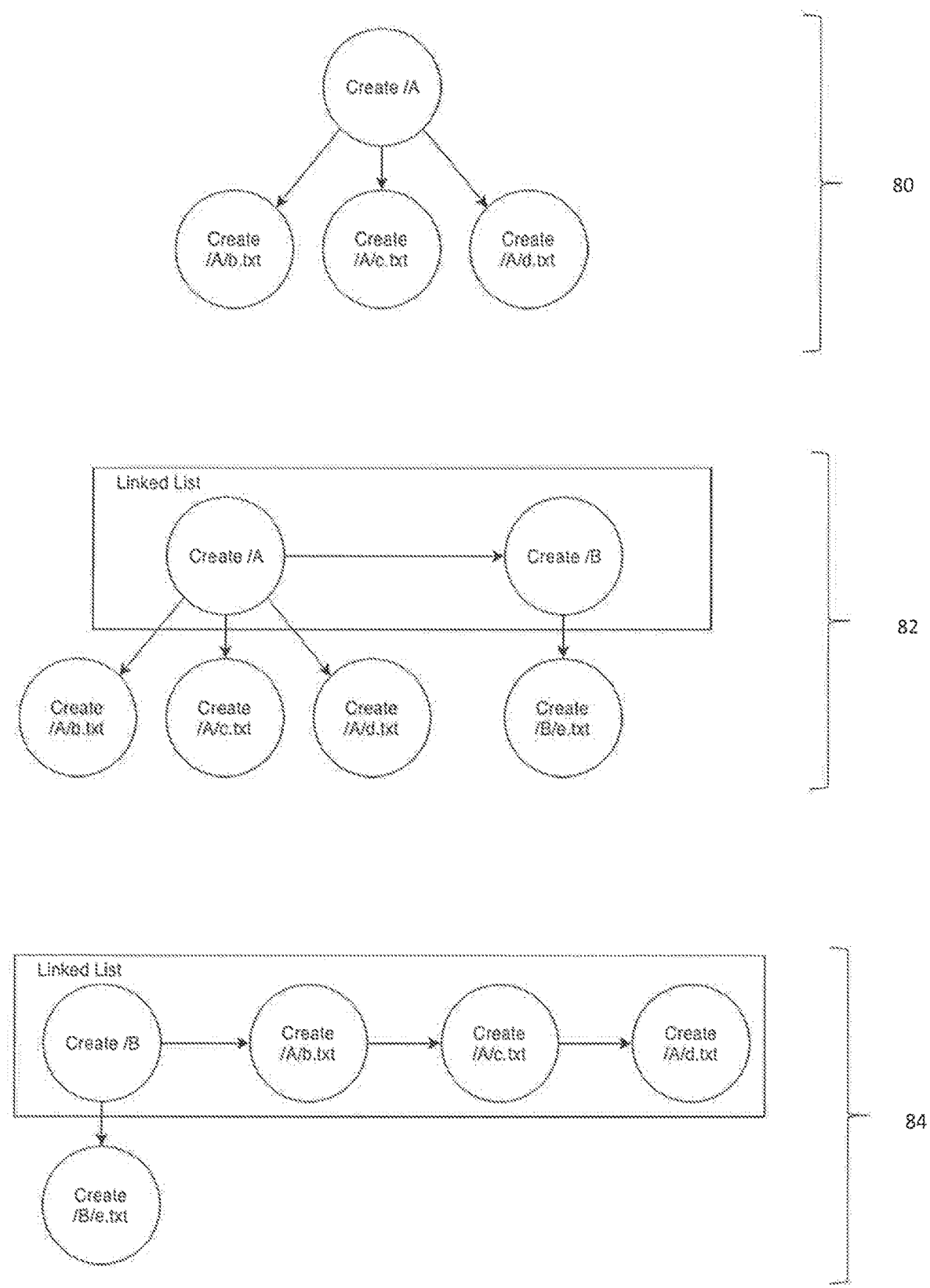
FIG. 2 depicts a first example of processing a polytree queue, in accordance with an illustrative embodiment.

FIG. 2 depicts an illustrative implementation of synchronization system 18, involving three stages of a polytree queue, 80, 82, and 84. Stage 80 shows the resulting polytree queue after nodes representing the actions of "Create folder /A", "Create file b.txt in Folder A/", "Create file c.txt in folder A/", and "Create file d.txt in folder A/", have been inserted. As shown, the nodes representing actions of creating the files b.txt, c.txt and d.txt are dependent on the node representing the action of creating folder /A. Accordingly, the node Create /A is inserted as a root node, and the nodes Create /A/b.txt, Create /A/c.txt, and Create /A/d.txt are inserted as child nodes of the root node.

Next, stage 82 shows insertion of two additional nodes, "Create folder /B" and "Create file e.txt in folder B/". As shown, the node representing the action of creating folder /B is not dependent on any other node so it is added as a root node Create /B, and a linked list is implemented indicating node Create /A has execution priority over node Create /B. The node representing the action of creating the file e.txt in folder /B is dependent on the node of creating folder /B, and is thus inserted as a dependent node Create /B/e.txt.

Stage 84 of the polytree queue shows the result after Create /A is executed. In this case, node Create /A is removed and the nodes Create /A/b.txt, Create /A/c.txt, and Create /A/d.txt are promoted to the root level, and added to the end of the linked list.

Figure 3:
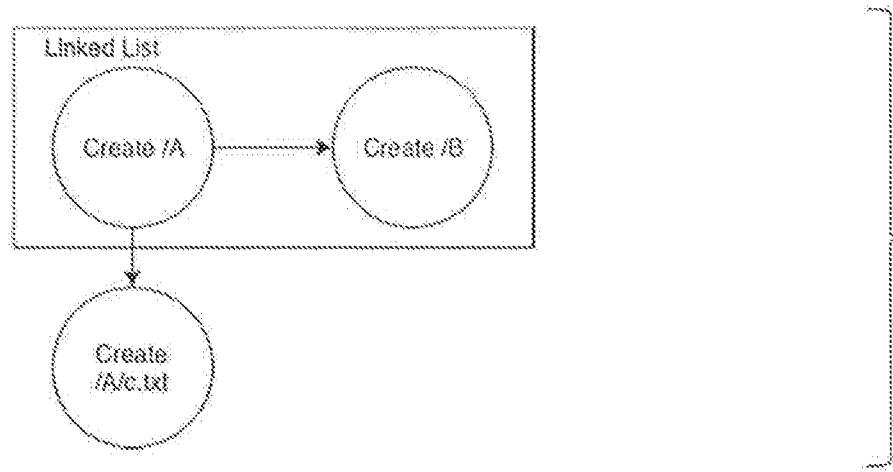
FIG. 3 depicts a second example of processing a polytree queue, in accordance with an illustrative embodiment.
Figure 3:
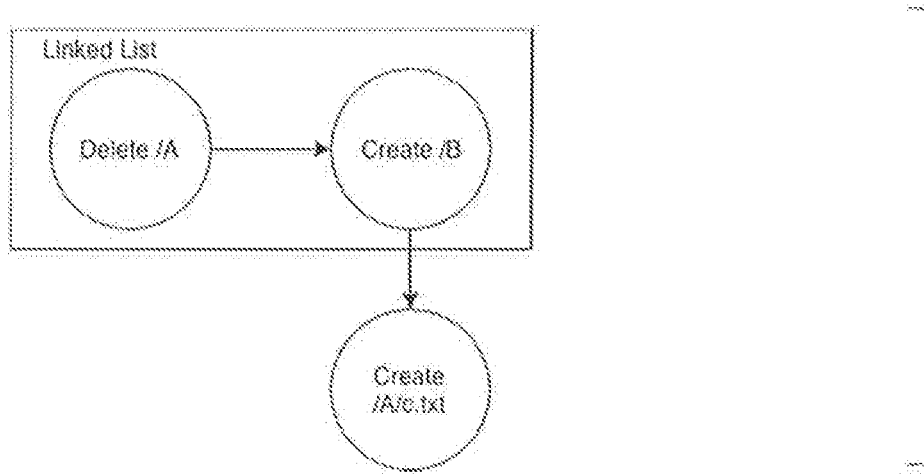

FIG. 3 depicts a further illustration involving an optimization of a polytree queue. Stage 86 shows the resulting polytree queue after the insertion of nodes for actions of "Create folder /A", "Create file c.txt in folder A/" and "Create folder /B". As shown, the nodes Create /A and Create /B are root nodes and the node Create /A/c.txt is dependent on node Create /A. Next the nodes for actions of Move file /A/c.txt to /B/c.txt and Delete /A are processed. In this case, nodes Create /A, Move file /A/c.txt and Delete /A are consumed into single node, Delete /A, by optimization system 24. Additionally, the node Create /A/c.txt is relocated by optimization system 24 to be dependent from node Create /B, as shown in stage 88.

Figure 4:
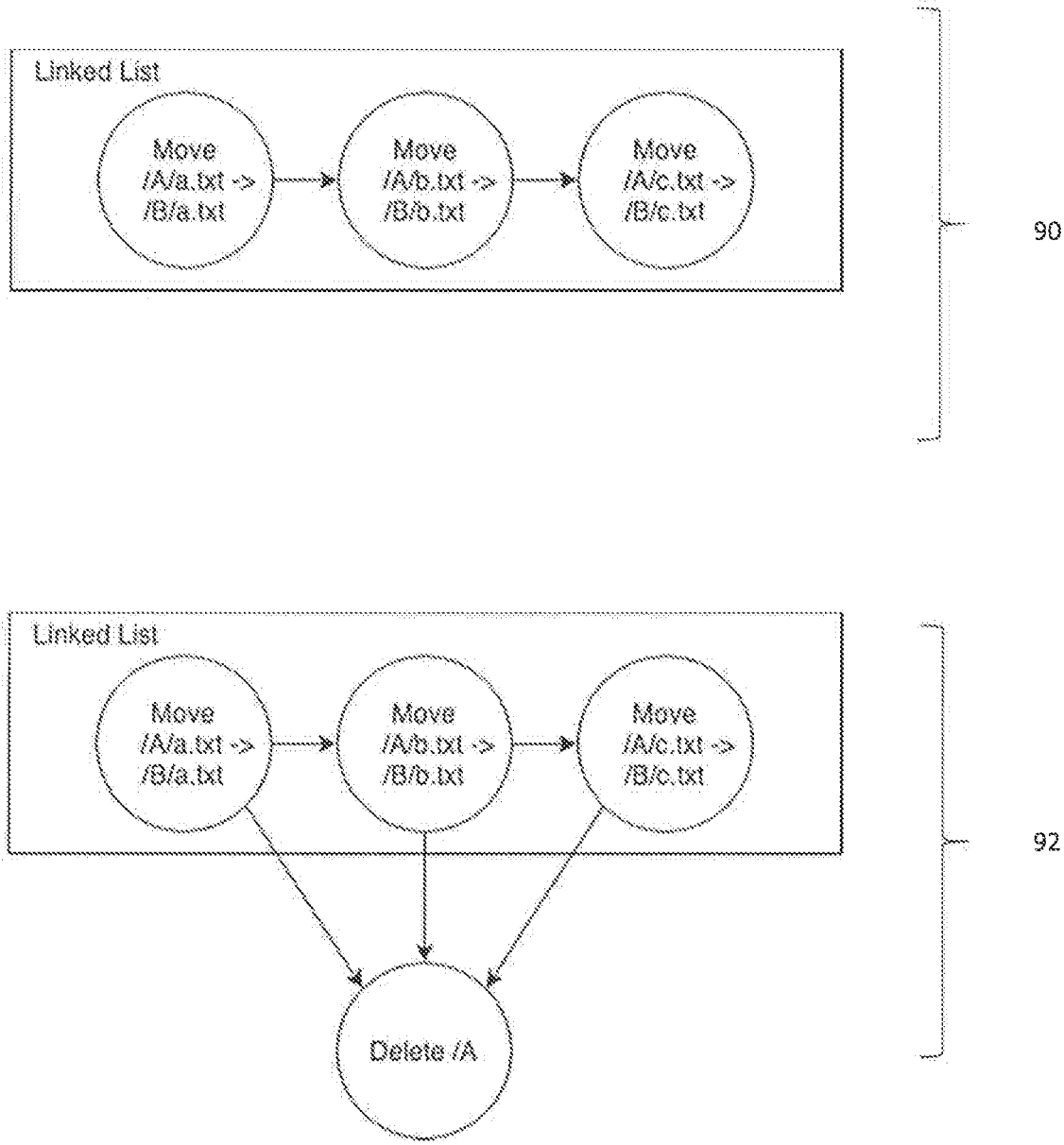
FIG. 4 depicts a third example of processing a polytree queue, in accordance with an illustrative embodiment.

FIG. 4 depicts an example involving a multi-parent polytree queue scenario. In this case, at stage 90, a polytree queue is shown resulting from the actions Move /A/a.txt to /B/a.txt, Move /A/b.txt to /B/b.txt and Move /A/c.txt to /B/c.txt. In this case, all nodes representing these file move actions are inserted as root nodes. Next, the node Delete /A is inserted into the polytree as shown in stage 92. Note that the action of deleting folder /A cannot take place until each of the three aforementioned files are first moved out of folder /A, or else the files would be inadvertently deleted. Accordingly, the node Delete /A is dependent upon each of the three root nodes. Thus, because a node cannot be promoted to root node if the node is dependent on any other node, the node Delete /A cannot be promoted until all three of the Move actions are first executed.

Figure 5:
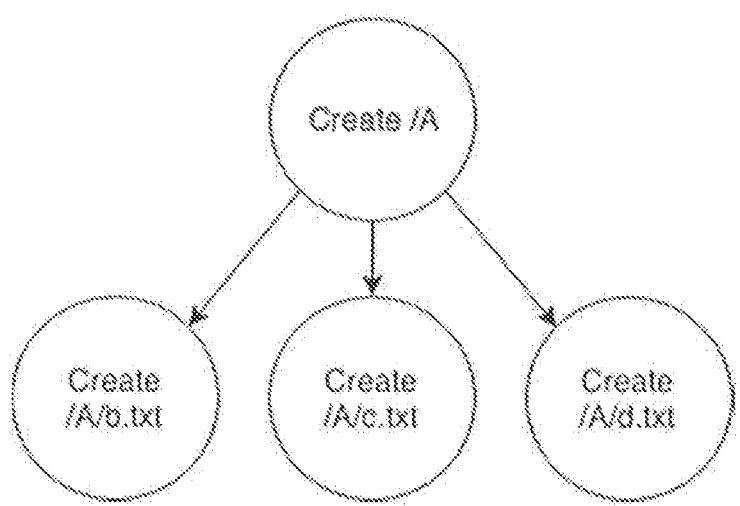
FIG. 5 depicts a fifth example of processing a polytree queue, in accordance with an illustrative embodiment.

FIG. 5 depicts an example in which hard dependencies exist between the parent and child nodes. In this case, the nodes for actions Create /A, Create /A/b.txt, Create /A/c.txt and Create /A/d.txt are inserted into the polytree queue. During execution, if Create /A fails, the dependent nodes cannot possibly execute since folder /A was never created. Thus, all the nodes must be processed by failure system 28 (FIG. 1), e.g., removed, reloaded for later execution or otherwise processed according to a failure protocol. Accordingly, in this case, hard dependencies are utilized between the children nodes and parent node.

Figure 6:
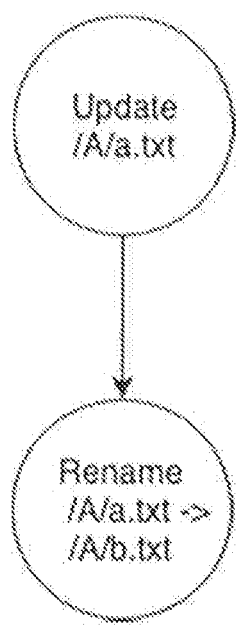
FIG. 6 depicts a sixth example of processing a polytree queue, in accordance with an illustrative embodiment.

FIG. 6 shows an example where a soft dependency may be utilized. In this case, the nodes for Update (i.e., Edit and Save) /A/a.txt and Rename /A/a.txt to /A/b.txt are inserted into the polytree queue. In the event Update /A/a.txt fails during execution, the node for the Rename action can still be executed. Thus, a soft dependency may be used in this case. Note that a dependency is still required since both actions could not execute at the same time.

Figure 7:
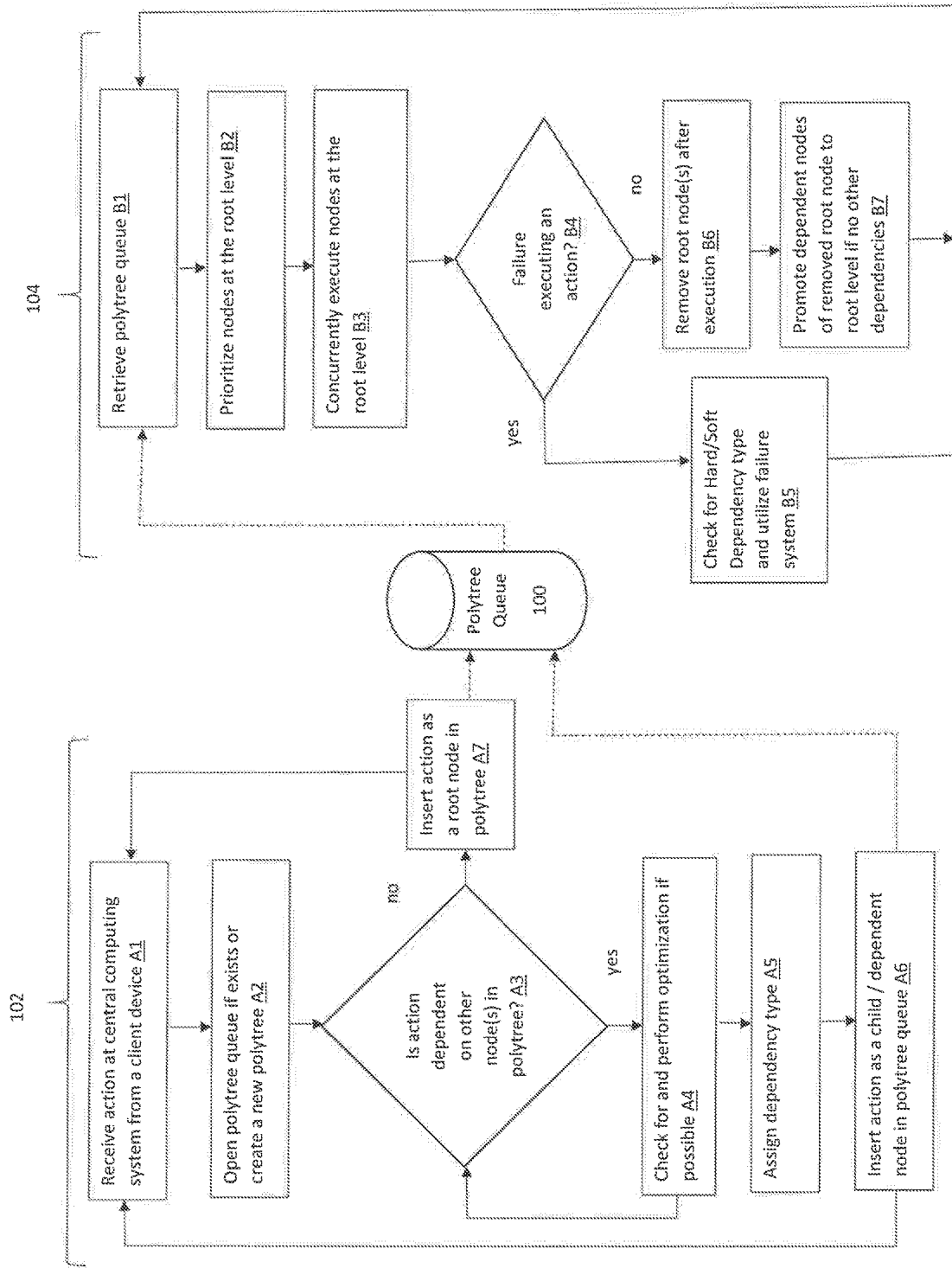
FIG. 7 depicts a flow diagram of a process for implementing a synchronization system, in accordance with an illustrative embodiment.

FIG. 7 depicts a flow diagram of a generalized process for synchronization system 18 (with reference to FIG. 1). The left-hand side of the of FIG. 7 shows an illustrative process 102 for implementing a polytree queue generator 20 to generate/update polytree queue 100 and the right-hand side shows an illustrative process 104 for implementing a polytree queue processor 30 for executing nodes representing actions in polytree queue 100. Although shown as two separate parallel processes, it is understood that any number of processes could be used, e.g., a single sequential process or more than two parallel processes.

Process 102 begins at A1 with receiving an action 42 at a cloud computing system 10 from a client device 40. At A2, either an existing polytree queue 100 is opened or a new polytree queue 100 is created if one does not exist. Next, at A3, a determination is made whether the received action is dependent on other nodes in the polytree queue 100. If no, then a node representing the action is inserted as a root node into the polytree queue 100, and the process loops back to A1, where a next action is retrieved. If yes at A3, then the process checks for possible optimizations and implements any such optimizations at A4. The optimization process may loop back to A3 to check to see if the optimization created a new node that eliminated dependencies of other nodes in the polytree queue. If so, the polytree queue 100 is updated as such with the new root node. (Note that the optimization process is optional, i.e., process 102 could be implemented without performing any optimizations.) Assuming that the action (either as retrieved or as optimized) is still dependent on another node in the polytree queue 100, then a dependency type (e.g., hard or soft) is assigned to the action at A5. The dependency type may for example be assigned based on rules (e.g., predefined or dynamic) that determine a type based on, e.g., a table of different parent and child node combinations. Next at A6, a node representing the action is inserted into the polytree queue 100 as a child/dependent node, and the process 102 then repeats at A1.

Process 104 begins at B1 in which the polytree queue 100 is retrieved for execution. At B2, nodes at the root level are prioritized (e.g., by updated a linked list), and at B3, the nodes at the root level are concurrently executed. At B4, a determination is made whether any of the actions reported a failure during execution, and if yes, then the dependency types (hard/soft) of any dependent nodes representing actions are checked and failure system 28 is implemented, e.g., if a soft dependency, then execute the dependent node. If no at B4, then each root node is removed from the polytree queue 100 after execution at B6, and any dependent nodes of the removed root nodes are promoted to the root node level so long as there are no other parent nodes for the dependent node. The process 104 then loops back to B1 and repeats.

The described solution provides a collaborative platform in which users on client devices 40 do not have to wait for actions to complete on the cloud before making subsequent actions. Further, users can work with their content even when they are offline. In this case, changes can be synced with the cloud as soon as the client device is back online. Moreover, bulk actions may require less time to complete by the cloud because optimizations can be applied to reduce the number of actions executed by the cloud. Further, this solution provides an enhanced failure protocol in which if one action fails, all the actions dependent on the failed action are readily identifiable.

It is noted that the described solutions can be applied to any environment in which actions are preferably executed concurrently so long as they are not dependent on other actions, and executed sequentially where dependencies exist. In the above example, the solution is utilized to effectively implement file system actions in a collaborative environment. The solution could likewise be utilized for a software build tool involving deployment of multiple tasks which are inter-dependent and should be built as fast as possible while respecting the dependency order.

Cloud computing system 10 (FIG. 1) may for example be implemented by a server-based computing environment that employs a network of remote, hosted servers to manage, store and/or process data, and may generally be referred to, or fall under the umbrella of, a "network service." The cloud computing system 10 may include a network of interconnected resources, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Cloud computing system 10 (FIG. 1) may comprise any type of computing device that for example includes at least one processor 12, memory, an input/output (I/O) 14, e.g., one or more I/O interfaces and/or devices, and a communications pathway or bus. In general, the processor(s) 12 execute program code which is at least partially fixed in memory 16. While executing program code, the processor(s) 12 can process data, which can result in reading and/or writing transformed data from/to memory and/or I/O 14 for further processing. The pathway provides a communications link between each of the components in the computing device. I/O 14 can comprise one or more human I/O devices, which enable a user to interact with the computing device and the computing device may also be implemented in a distributed manner such that different components reside in different physical locations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
a memory; and
a processor coupled to the memory, and the processor configured to:
receive data from a plurality of client devices, the data being indicative of actions associated with a shared resource accessible by the plurality of client devices,
insert a plurality of actions as nodes into a polytree queue defined by a tree structure in which root level nodes form branches of the tree structure and are located on a same level in the tree structure as parent nodes, and wherein at least one child node depends from multiple parent nodes, wherein actions that do not depend on other actions in the polytree queue are inserted as root level nodes, and actions that depend on other actions in the polytree queue are inserted as child nodes, and
execute the nodes in the polytree queue to synchronize the data from the plurality of client devices with the shared resource, wherein root level nodes are scheduled for immediate concurrent execution with each other, and execution of child nodes is delayed until parent nodes of an associated child node are executed,
wherein the at least one child node that depends from multiple parent nodes is promoted to a root level node only after execution of all of the multiple parent nodes, and
wherein the polytree queue includes a first root level node that is prioritized over a second root level node based on a first-in first-out scheme, wherein the first root level node has a plurality of child level nodes dependent therefrom, and wherein after execution of the first root level node, the plurality of child nodes are promoted to root level nodes for execution after the second root level node.

2. The system of claim 1, wherein after execution of the first root level node, the first root level node is removed from the polytree queue, and wherein the multiple parent nodes of the at least one child node are located on a same level in the tree structure as a distinct parent node with a distinct child node.

3. The system of claim 1, wherein in response to an execution failure of a node, the processor is further configured to:
remove the node from the polytree queue as a failing node;

determine whether at least one dependent node of the failing node is typed as a hard dependency or a soft dependency;
remove dependent nodes from the polytree queue typed as hard dependencies; and
maintain dependent nodes typed as soft dependencies in the polytree queue.

4. The system of claim 3, wherein the soft dependency indicates that there is no ordering requirement between the dependent node and associated parent node and the dependent node and associated parent node cannot execute simultaneously.

5. The system of claim 3, wherein the hard dependency indicates that there is an ordering requirement between the dependent node and associated parent node.

6. The system of claim 1, wherein the processor is further configured to analyze dependent actions and, in response to a determination that a dependent action being inserted into the polytree queue can be combined with an action of a parent node, collapses the dependent action into the parent node.

7. A method, comprising:
receiving data from a client device, the data being indicative of actions associated with a shared resource accessible by a plurality of client devices;
inserting the actions as nodes into a polytree queue defined by a tree structure in which root level nodes form branches of the tree structure and are located on a same level in the tree structure as parent nodes, and wherein at least one child node depends from multiple parent nodes, wherein actions that do not depend on other actions in the polytree queue are inserted as root level nodes, and actions that depend on other actions in the polytree queue are inserted as child nodes; and
executing nodes in the polytree queue to synchronize data from the client device with the shared resource, wherein root level nodes are scheduled for immediate concurrent execution with each other, and execution of child nodes is delayed until parent nodes of an associated child node are executed,
wherein the at least one child node that depends from multiple parent nodes is promoted to a root level node only after execution of all of the multiple parent nodes, and
wherein the polytree queue includes a first root level node that is prioritized over a second root level node based on a first-in first-out scheme, wherein the first root level node has a plurality of child level nodes dependent therefrom, and wherein after execution of the first root level node, the plurality of child nodes are promoted to root level nodes for execution after the second root level node.

8. The method of claim 7, further comprising analyzing dependent actions and, in response to a determination that a dependent action being inserted into the polytree queue can be combined with a parent node, collapsing the dependent action into the parent node.

9. The method of claim 7, wherein after execution of the root level node, the root level node is removed from the polytree queue, wherein the actions involve file system operations that include: create, delete, move, rename, upload, save and update, and wherein the multiple parent nodes of the at least one child node are located on a same level in the tree structure as a distinct parent node with a distinct child node.

10. The method of claim 7, further comprising, in response to a failure while executing a node:
removing the node from the polytree queue as a failing node;
determining whether each dependent node of the failing node is typed as a hard dependency or a soft dependency;
removing dependent nodes from the polytree queue typed as hard dependencies; and
maintaining dependent nodes typed as soft dependencies in the polytree queue.

11. The method of claim 10, wherein the soft dependency indicates that there is no ordering requirement between the dependent node and associated parent node and that the dependent node and associated parent node cannot execute simultaneously.

12. The method of claim 10, wherein the hard dependency indicates that there is an ordering requirement between the dependent node and associated parent node.

13. A computer program product stored on a non-transitory computer readable medium, which when executed by a processor, synchronizes client device data, the program product comprising:
program code for receiving data from a client device, the data being indicative of actions associated with a shared resource accessible by a plurality of client devices;
program code for inserting the actions as nodes into a polytree queue defined by a tree structure in which root level nodes form branches of the tree structure and are located on a same level in the tree structure as parent nodes, and wherein at least one child node depends from multiple parent nodes, wherein actions that do not depend on other actions in the polytree queue are inserted as root level nodes, and actions that depend on other actions in the polytree queue are inserted as child nodes; and
program code for executing nodes in the polytree queue to synchronize data from the client device with the shared resource, wherein root level nodes are scheduled for immediate concurrent execution with each other, and execution of child nodes is delayed until all parent nodes of an associated child node are executed,
wherein the at least one child node that depends from multiple parent nodes is promoted to a root level node only after execution of all of the multiple parent nodes, and
wherein the polytree queue includes a first root level node that is prioritized over a second root level node based on a first-in first-out scheme, wherein the first root level node has a plurality of child level nodes dependent therefrom, and wherein after execution of the first root level node, the plurality of child nodes are promoted to root level nodes for execution after the second root level node.

14. The program product of claim 13, further comprising program code for analyzing dependent actions and, in response to a determination that a dependent action being inserted into the polytree queue can be combined with a parent node, collapsing the dependent action into the parent node.

15. The system of claim 1, wherein inserting a child node includes examination of different branches of the tree structure to identify a dependency and insert the child node into branches in which a dependency exists.

16. The method of claim 7, wherein inserting a child node includes examination of different branches of the tree structure to identify a dependency and insert the child node into branches in which a dependency exists.

17. The program product of claim 13, wherein inserting a child node includes examination of different branches of the tree structure to identify a dependency and insert the child node into branches in which a dependency exists.

* * * * *